United States Patent Office 3,131,194
Patented Apr. 28, 1964

3,131,194
SUBSTITUTED 2-AMINOISONICOTINIC ACID HYDRAZIDES
William F. Bruce, Havertown, and Alan D. Lourie, Bala-Cynwyd, Pa., assignors to American Home Products Corporation, New York, N.Y., a corporation of Delaware
No Drawing. Filed Dec. 14, 1962, Ser. No. 244,586
12 Claims. (Cl. 260—295)

This invention relates to novel substituted 2-aminoisonicotinic acid hydrazides and to a process for the production thereof.

The novel compounds made available by the present invention exhibit sedative and analgesic activity. Unlike other hydrazine compounds, the novel compounds of this invention do not appreciably inhibit monoamine oxidase.

The compounds sought to be patented are represented by the following formula:

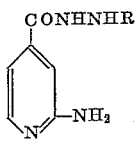

wherein R represents a lower alkyl radical, preferably having from 2 to 9 carbon atoms; a cycloalkyl radical, preferably having from 5 to 8 carbon atoms; or a 1-cycloalkyl-alkyl radical, preferably having from 4 to 8 carbon atoms.

The novel compounds made available by the present invention are prepared by the process illustrated by the following equation:

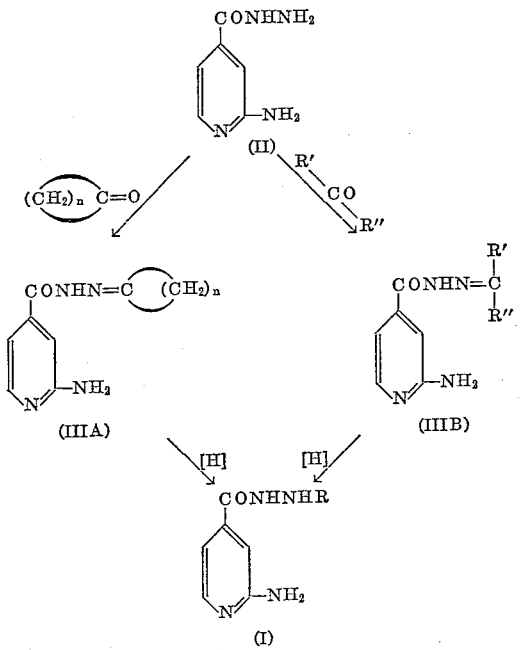

In the above formulas, $n$ ranges from 4 to 7, R' represents a lower alkyl radical having from one to six carbon atoms or a cyclo alkyl radical having from 3 to 5 carbon atoms in its ring, R" represents hydrogen or a lower alkyl radical having from one to 2 carbon atoms; and R has the meaning previously set forth.

In practising the process outlined above, 2-aminoisonicotinic acid hydrazide (II) is condensed with the appropriate carbonyl starting material to form the corresponding Schiff base (IIIA), (IIIB), which is then catalytically hydrogenated with, for example, hydrogen and a suitable catalyst such as platinum oxide.

Formation of the Schiff base preferably is carried out by refluxing the reactants in a solvent inert to the reaction, such as anhydrous ethanol, for a period ranging from 15 minutes, for the lower molecular weight carbonyl reactants, to around 24 hours, for the more sterically hindered reactants. The Schiff bases formed by the previously described step are then partially dissolved in an inert anhydrous solvent, such as ethanol, methanol or 2-methoxyethanol. A noble metal catalyst or its oxide is added to the resulting mixture and the whole is agitated with hydrogen in a suitable hydrogenation vessel at room temperature until no more hydrogen is absorbed by the hydrazide. Where it is noted that absorption has ceased and that less than the theoretical amount of hydrogen has been absorbed, the hydrogenation step is interrupted; additional catalyst is introduced into the reaction mass and hydrogenation is resumed and continued until no more hydrogen is absorbed.

The starting 2-aminoisonicotinic acid hydrazide conveniently may be prepared by warming ethyl 2-amino isonicotinate with hydrazine hydrate.

The following examples, in which temperatures are in degrees centigrade, represent the best mode of carrying out the present invention.

EXAMPLE 1

*2-aminoisonicotinic acid hydrazide.*—Ethyl 2-aminoisonicotinate (9.9 g., 0.0597 mole) was heated on a steam bath with 12 ml. hydrazine hydrate for five to ten minutes. The product was washed with absolute ethanol. The yield was 8.5 g. (93.7%), M.P. 186–190°.

EXAMPLE 2

*2-aminoisonicotinic acid 2-isopropylidenehydrazide.*—2-aminoisonicotinic acid hydrazide (5.0 g., 0.0331 mole) was refluxed for one half hour in 100 ml. absolute acetone. After cooling, 5.8 g. (91.8%) product was filtered off, M.P. 199–201°.

*Analysis.*—Calcd. for $C_9H_{12}N_4O$: C, 56.23; H, 6.30; N, 29.14. Found: C, 56.19; H, 6.12; N, 29.11.

*2-aminoisonicotinic acid 2-isopropylhydrazide.*—2-aminoisonicotinic acid 2-isopropylidenehydrazide (8.0 g., 0.0417 mole) was dissolved in 200 ml. absolute methanol with 500 mg. platinum oxide, and the mixture shaken with hydrogen in a Parr apparatus at room temperature for about two hours. The hydrogen absorption was approximately theoretical. The catalyst was filtered off and the solvent evaporated in vacuo. Recrystallization of the residue from acetone gave 3.7 g. (39.6%) product, M.P. 195–198°. The mixed melting point with starting material was 174–191°. A second crop yielded 1.3 g. (total yield: 61.8%).

*Analysis.*—Calcd for $C_9H_{14}N_4O$: C, 55.65; H, 7.27; N, 28.84. Found: C, 55.92; H, 7.48; N, 28.71.

EXAMPLE 3

*2-aminoisonictinic acid 2-valerylidenehydrazine.*—2-aminoisonicotinic acid hydrazide (6.3 g., 0.0414 mole) was refluxed with 3.6 g. (0.0418 mole) valeraldehyde and 100 ml. absolute ethanol for one hour. The solution was cooled and 4.4 g. (48.3%) product filtered off, M.P. 183–186°. A second crop yielded 1.6 g. (total yield: 65.8%).

*Analysis.*—Calcd. for $C_{11}H_{16}N_4O$: C, 59.98; H, 7.32; N, 25.44. Found: C, 59.85; H, 7.28; N, 25.65.

*2-aminoisonicotinic acid 2-valerylhydrazide.*—2-aminoisonicotinic acid 2-valerylidenehydrazide (4.9 g., 0.0223 mole) was dissolved in 200 ml. absolute methanol with 500 mg. platinum oxide, and the mixture shaken with hydrogen in a Parr apparatus at room temperature for about two and three quarter hours. The hydrogen absorption was slightly greater than the theoretical amount. The catalyst was filtered off and the solvent evaporated in vacuo. The crude product was recrystallized from water containing a little ethanol to yield 2.9 g. (58.7%), M.P. 171–173°. The mixed melting point with starting material was 165–168°. A second crop yielded 0.5 g. (total yield: 68.7%).

Analysis.—Calcd. for $C_{11}H_{18}N_4O$: C, 59.43; H, 8.16; N, 25.21. Found: C, 59.21; H, 7.97; N, 25.18.

EXAMPLE 4

*2 - aminoisonicotinic acid 2 - cyclopentylidenehydrazide.*—2-aminoisonicotinic acid hydrazide (3.5 g., 0.023 mole) was refluxed for fifteen minutes with 12 ml. cyclopentanone and 50 ml. absolute ethanol. The mixture was cooled and 4.65 g. (92.7%) product was filtered off, M.P. 255–260° (dec.).

Analysis.—Calcd. for $C_{11}H_{14}N_4O$: C, 60.53; H, 6.47; N, 25.67. Found: C, 59.69; H, 6.47; N, 25.73.

*2-aminoisonicotinic acid 2-cyclopentylhydrazide*—2-aminoisonicotinic acid 2-cyclopentylidenehydrazide (4.65 g., 0.0213 mole) was partially dissolved in 200 ml. absolute ethanol with 1.0 g. platinum oxide, and the mixture shaken with hydrogen in a Parr apparatus at room temperature for one and one half hours. Slightly less than the theoretical amount of hydrogen was absorbed. The catalyst and undissolved starting material were filtered off and the solvent evaporated in vacuo to give 0.2 g. product, M.P. 170–175°. The catalyst and unreacted starting material were washed with hot ethanol and the washings put back into the Parr apparatus with 500 mg. ffresh catalyst. The solution was then heated to 50° and again shaken with hydrogen. The calculated amount of hydrogen was absorbed. The catalyst was filtered off and the solvent evaporated in vacuo. The residue was recrystallized from absolute ethanol to yield 1.2 g., M.P. 175–177°.

Analysis.—Calcd. for $C_{11}H_{16}N_4O$: C, 59.98; H, 7.32; N, 25.44. Found: C, 59.83; H, 6.79; N, 24.81.

EXAMPLE 5

*2-aminoisonicotinic acid 2-cyclohexylidenehydrazine.*—2-aminoisonicotinic acid hydrazide (6.0 g., 0.0395 mole) was refluxed for one hour with (5.0 g., 0.051 mole) cyclohexanone and 150 ml. absolute ethanol. The solution was cooled and 7.2 g. (78.4%) product filtered off, M.P. 224–226°. A second crop yielded 1.1 g. (total yield: 90.4%).

Analysis.—Calcd. for $C_{12}H_{16}N_4O$: C, 62.05; H, 6.94; N, 24.12. Found: C, 61.65; H, 6.56; N, 24.33.

*2-aminoisonicotinic acid 2-cyclohexylhydrazide.*—2-aminoisonicotinic acid 2-cyclohexylidenehydrazide (7.0 g., 0.0302 mole) was partially dissolved in 250 ml. 2-methoxyethanol with 500 mg. platinum oxide, and the mixture shaken with hydrogen in a Parr apparatus at room temperature for two hours. The hydrogen adsorption was slightly greater than the theoretical amount. The catalyst was filtered off and the solvent evaporated in vacuo. The crude product was recrystallized from isopropyl alcohol to yield 3.0 g. (42.4%), M.P. 220–223°. The mixed melting point with starting material was 209–217°. A second crop yielded 1.3 g. (total yield: 60.8%).

Analysis.—Calcd. for $C_{12}H_{18}N_4O$: C, 61.51; H, 7.74; N, 23.92. Found: C, 61.43; H, 7.45; N, 23.90.

EXAMPLE 6

*2-aminoisonicotinic acid 2-(1-cyclopropylethylidene)hydrazide.*—2-aminoisonicotinic acid hydrazide (7.0 g., 0.0461 mole) was refluxed for seventeen hours with 12.6 g. (0.15 mole) methyl cyclopropyl ketone and 50 ml. absolute ethanol. After a small amount of insoluble material was filtered off, the solution was evaporated to dryness in vacuo. The residue was recrystallized from ethyl acetate to yield 5.4 g. (53.7%) product, M.P. 158–159°.

Analysis.—Calcd. for $C_{11}H_{14}N_4O$: C, 60.53; H, 6.47; N, 25.67. Found: C, 60.42; H, 6.58; N, 25.80.

*2-aminoisonicotinic acid 2-(1-cyclopropylethyl)hydrazide.*—2-aminoisonicotinic acid 2-(1-cyclopropylethylidene)hydrazide (4.9 g., 0.0225 mole) was partially dissolved in 200 ml. absolute ethanol with 500 mg. platinum oxide, and the mixture shaken with hydrogen in a Parr apparatus at room temperature for about three quarters of an hour when the hydrogen uptake stopped, although only one half the theoretical amount had been absorbed. 500 mg. more catalyst was added and the reaction mixture again shaken with hydrogen for two hours. During this second reaction period, the calculated amount of hydrogen was absorbed. The catalyst was filtered off and the solvent evaporated in vacuo. The crude product was recrystallized from absolute ethanol to yield 1.3 g. (26.3%), M.P. 167–169°. Two more crops gave 2.2 g. (total yield: 70.7%)

Analysis.—Calcd. for $C_{11}H_{16}N_4O$: C, 59.98; H, 7.32; N, 25.44. Found: C, 59.92; H, 7.64; N, 25.42.

When 2-aminoisonicotinic acid hydrazide is reacted according to the above procedures with the compounds listed below, and the resulting compounds hydrogenated, the products hereinafter set forth are obtained:

| Starting Compounds | Products |
|---|---|
| Cycloheptanone | 2-aminoisonicotinic acid 2-cycloheptylhydrazide. |
| Cyclooctanone | 2-aminoisonicotinic acid 2-cyclooctylhydrazide. |
| Acetaldehyde | 2-aminoisonicotinic acid 2-ethylhydrazide. |
| Propionaldehyde | 2-aminoisonicotinic acid 2-propylhydrazide. |
| Butyraldehyde | 2-aminoisonicotinic acid 2-butylhydrazide. |
| Capryladehyde | 2-aminoisonicotinic acid 2-caprylhydrazide. |
| 3-pentanone | 2-aminoisonicotinic acid 2-(1-ethylpropyl)hydrazide. |
| 2-butanone | 2-aminoisonicotinic acid 2-(1-methylpropyl)hydrazide. |
| Cyclopropyl ethyl ketone | 2-aminoisonicotinic acid 2-(1-cyclopropylpropyl)hydrazide. |
| Cyclobutyl methyl ketone | 2-aminoisonicotinic acid 2-(1-cyclobutylethyl)hydrazide. |
| Cyclobutyl ethyl ketone | 2-aminoisonicotinic acid (2-(1-cyclobutylpropyl)hydrazide. |
| Cyclopentyl ethyl ketone | 2-aminoisonicotinic acid 2-(1-cyclopentylpropyl)hydrazide. |
| Cyclopentyl methyl ketone | 2-aminoisonicotinic acid 2-(1-cyclopentylethyl)hydrazide. |

The compounds of this invention can be administered in a wide variety of oral or parenteral unit dosage forms, singly, or in admixture with other active compounds.

The present invention also includes the process of bringing the compounds thereof into a form suitable for therapeutic administration by associating them with liquid or solid, pharmaceutically acceptable carriers.

Various changes and modifications of this invention can be made by those skilled in the art to which it relates and to the extent that such variations incorporate the spirit of the invention, they are included in the scope of the claims.

What is claimed is:
1. A compound of the formula:

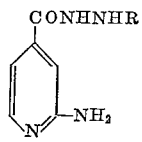

wherein R is selected from the group consisting of the lower alkyl groups having from 2 to 8 carbon atoms in the alkyl chain, the cycloalkyl groups having from 5 to 8 carbon atoms in the ring and the 1-cycloalkylalkyl groups having a total carbon content ranging from 5 to 8 carbon atoms.

2. A compound represented by a formula selected from the group consisting of

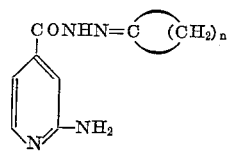

and

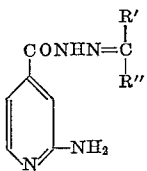

wherein n ranges from 4 to 7, R' is a substituent selected from the group consisting of lower alkyl having from one to 6 carbon atoms and cycloalkyl having from 3 to 5 carbon atoms and R" is selected from the group consisting of hydrogen and lower alkyl having from one to 2 carbon atoms.

3. 2-aminoisonicotinic acid 2-isopropylidenehydrazide.
4. 2-aminoisonicotinic acid 2-valerylidenehydrazide.
5. 2 - aminoisonicotinic acid 2 - cyclopentylidenehydrazide.
6. 2-aminoisonicotinic acid 2-cyclohexylidenehydrazide.
7. 2 - aminoisonicotinic acid 2 - (1 - cyclopropylethylidene)hydrazide.
8. 2-aminoisonicotinic acid 2-isopropylhydrazide.
9. 2-aminoisonicotinic acid 2-valerylhydrazide.
10. 2-aminoisonicotinic acid 2-cyclopentylhydrazide.
11. 2-aminoisonicotinic acid 2-cyclohexylhydrazide.
12. 2-aminoisonicotinic acid 2-(1-cyclopropylethyl)hydrazide.

References Cited in the file of this patent
UNITED STATES PATENTS

| | | |
|---|---|---|
| 2,703,322 | Fox | Mar. 1, 1955 |
| 2,767,192 | Offe et al. | Oct. 16, 1956 |

FOREIGN PATENTS

| | | |
|---|---|---|
| 726,230 | Great Britain | Mar. 16, 1955 |

OTHER REFERENCES

Yale et al.: JACS, vol. 75, pages 1933–1942 (1953).
Fox et al.: J. Org. Chem., vol. 18, pages 983–1002 (1953).
Abstracting Kakimoto et al., "Japan J. Tuberc." vol. 2, pages 334–7 (1954).
Stanonis: J. Org. Chem., vol. 22, page 475 (1957).
"Chemical Abstracts," vol. 50, pages 14744–5.